(12) United States Patent
Williams et al.

(10) Patent No.: US 10,044,587 B2
(45) Date of Patent: *Aug. 7, 2018

(54) SYSTEMS AND METHODS FOR DYNAMICALLY SETTING A RATE LIMIT FOR A COMPUTING DEVICE

(71) Applicant: CirrusWorks, Inc., Tysons, VA (US)

(72) Inventors: Kevin David Williams, Arlington, VA (US); Michael Paul Lovett, Washington, DC (US); David Frederick Giannini, Washington, DC (US)

(73) Assignee: CIRRUSWORKS, INC., Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/719,533

(22) Filed: Sep. 28, 2017

(65) Prior Publication Data
US 2018/0026866 A1    Jan. 25, 2018

Related U.S. Application Data

(63) Continuation of application No. 13/829,073, filed on Mar. 14, 2013, now Pat. No. 9,800,483.
(Continued)

(51) Int. Cl.
*G06F 15/173* (2006.01)
*H04L 12/26* (2006.01)
(Continued)

(52) U.S. Cl.
CPC ...... *H04L 43/0876* (2013.01); *H04L 41/0896* (2013.01); *H04L 43/0882* (2013.01);
(Continued)

(58) Field of Classification Search
CPC ........... H04N 21/2385; H04N 21/2402; H04N 21/26216; H04W 24/02; H04W 72/0486; H04L 43/0876; H04L 45/125; H04L 47/822; H04L 41/0896; H04L 67/10; H04L 41/0823
See application file for complete search history.

(56) References Cited

U.S. PATENT DOCUMENTS 8,644,161 B2   2/2014 Woundy et al.
2004/0199635 A1* 10/2004 Ta ....................... H04L 41/0893
                                                       709/226
(Continued)

*Primary Examiner* — Hitesh Patel
(74) *Attorney, Agent, or Firm* — Pillsbury Winthrop Shaw Pittman LLP

(57) ABSTRACT

In certain embodiments, facilitation of a dynamic rate limit may be provided. In some embodiments, an amount of aggregated bandwidth consumption for a set of computing devices on a network may be determined for a first time period. A total amount of available bandwidth on the network may be determined for the first time period. A ratio of the amount of aggregated bandwidth consumption to the total amount of available bandwidth may be determined. A bandwidth threshold may be determined based on the ratio. A rate limit for a first computing device (of the set of computing devices) may be dynamically set based on a comparison of the bandwidth threshold to bandwidth consumption of the first computing device.

18 Claims, 6 Drawing Sheets

Related U.S. Application Data

(60) Provisional application No. 61/623,843, filed on Apr. 13, 2012.

(51) Int. Cl.
*H04L 12/911* (2013.01)
*H04L 12/801* (2013.01)
*H04L 12/815* (2013.01)
*H04L 12/24* (2006.01)

(52) U.S. Cl.
CPC ............ *H04L 47/22* (2013.01); *H04L 47/29* (2013.01); *H04L 47/822* (2013.01)

(56) References Cited

U.S. PATENT DOCUMENTS

| | | |
|---|---|---|
| 2004/0218604 A1 | 11/2004 | Porter et al. |
| 2005/0105554 A1 | 5/2005 | Kagan et al. |
| 2006/0280168 A1* | 12/2006 | Ozaki ................. H04L 47/11 370/352 |
| 2007/0237103 A1 | 10/2007 | Reynolds et al. |
| 2009/0175235 A1 | 7/2009 | Spinar et al. |
| 2009/0180430 A1 | 7/2009 | Fadell |
| 2010/0103820 A1 | 4/2010 | Fuller et al. |
| 2011/0083154 A1 | 4/2011 | Boersma |
| 2013/0016667 A1 | 1/2013 | Blomqvist et al. |
| 2013/0124719 A1 | 5/2013 | Espinosa |
| 2013/0159494 A1* | 6/2013 | Danda ................. H04L 41/5067 709/224 |

* cited by examiner

SYSTEMS AND METHODS FOR DYNAMICALLY SETTING A RATE LIMIT FOR A COMPUTING DEVICE

CROSS-REFERENCE TO RELATED APPLICATIONS

This application is a continuation of U.S. patent application Ser. No. 13/829,073, filed on Mar. 14, 2013, which claims the benefit of U.S. Provisional Patent Application No. 61/623,843, entitled "DYNAMIC BANDWIDTH ALLOCATION FOR OPTIMIZING NETWORK UTILIZATION", filed on Apr. 13, 2012, which is incorporated herein by reference in its entirety.

BACKGROUND

Multiple applications that run on and/or are connected to a network frequently share a common connection to the Internet. Because the Internet Protocol or similar messaging or signaling system (e.g., Transmission Control Protocol (TCP)) seeks to send data through a network at a maximum rate, the multiple applications can compete for the limited Internet connection bandwidth. This competition can result in dropped data packets. This can lead to latency and/or slower transfer rates for users. As the number of users and/or applications sharing the network connection increases, this competition results in increasingly slower data transfer and/or poor user experience.

Some known data networks tend to treat Internet Protocol (IP) traffic equally on a first-come, first-served basis, even though traffic generated by different applications may have different characteristics. Users have different expectations for speed, latency and reliability depending on the application in use. For example, users of a compute device downloading a compact disk or other disk image such as ISO image, uploading a website for deployment or engaging in peer-to-peer file sharing expect a substantial time period to accomplish the data transfer. On the other hand, users of a compute device checking e-mail or viewing websites transfer data in short, relatively infrequent bursts, and expect a more interactive experience. Because the data transferred by IP is given equal priority, users running applications characterized by short bursts of interactive traffic are adversely affected by applications characterized by bulk transfers of non-interactive data.

Some known commercially available bandwidth management tools allow for the arbitrary restriction of bandwidth consumption imposed upon each user. This solution merely inhibits individual users to an assigned bandwidth limit. This static solution does not adapt bandwidth allocation per users' consumption requirements at a given time relative to other users' consumption. In other words, each user suffers restricted bandwidth, regardless of current network capacity or relative priority among users and applications.

Therefore, a need exists for dynamic bandwidth allocation and optimization based on relative requirements at a given time.

SUMMARY

In some embodiments, an amount of aggregated bandwidth consumption for a set of computing devices on a network may be determined for a first time period. A total amount of available bandwidth on the network may be determined for the first time period. A ratio of the amount of aggregated bandwidth consumption to the total amount of available bandwidth may be determined. A bandwidth threshold may be determined based on the ratio. A rate limit for a first computing device (of the set of computing devices) may be dynamically set based on a comparison of the bandwidth threshold to bandwidth consumption of the first computing device.

In some embodiments, an amount of aggregated bandwidth consumption for a set of computing devices on a network may be determined. A total amount of available bandwidth on the network may be determined. A ratio of the amount of aggregated bandwidth consumption to the total amount of available bandwidth may be determined. A bandwidth threshold may be determined based on the ratio. First bandwidth consumption of a first computing device (of the set of computing devices) that is measured for a first time period may be determined. Second bandwidth consumption of the first computing device that is measured for a second time period (of different length than the first time period) may be determined. A rate limit for the first computing device may be dynamically set based on a comparison of the bandwidth threshold to at least one of the first bandwidth consumption or the second bandwidth consumption.

In some embodiments, an amount of aggregated bandwidth consumption for a set of computing devices on a network may be determined for a first time period. A total amount of available bandwidth on the network may be determined for the first time period. A ratio of the amount of aggregated bandwidth consumption to the total amount of available bandwidth may be determined. A bandwidth threshold may be determined based on the ratio. A first computing device of the set of computing devices may be classified based on a comparison of the bandwidth threshold to bandwidth consumption of the first computing device. A rate limit for a first computing device of the set of computing devices may be dynamically set based on the classification of the first computing device.

DETAILED DESCRIPTION

Figure 1:
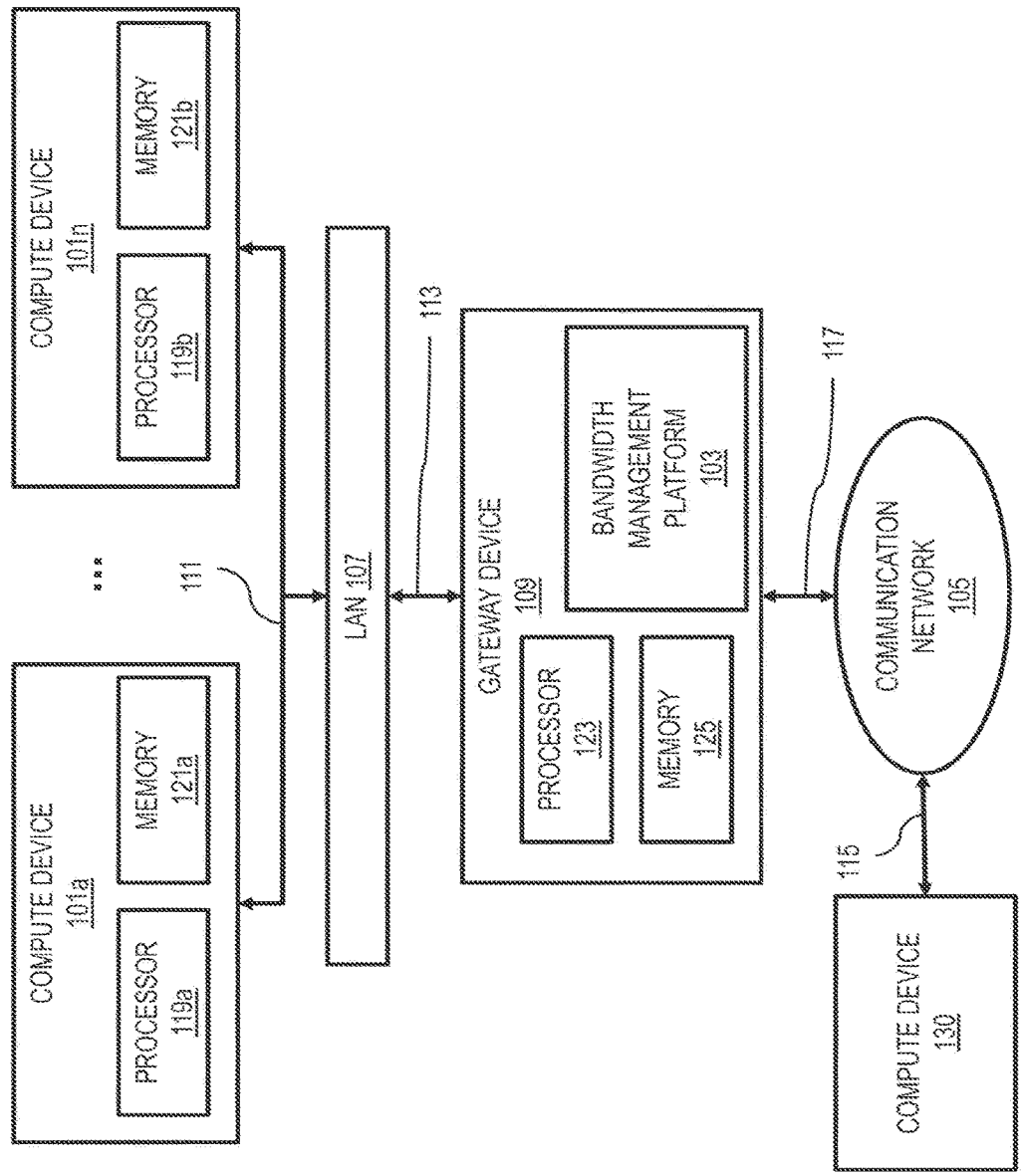
FIG. 1 is a schematic block diagram of a computer system in which dynamic bandwidth allocation can be performed, according to an embodiment.

In some embodiments, an apparatus includes a threshold calculation module implemented in at least one of a memory or a processing device, a use identification module operatively coupled to the threshold calculation module, and a rate limiting module operatively coupled to the use identification module. The threshold calculation module is configured to receive at a time a datum associated with use of a network by a set of compute devices using the network. The threshold calculation module is also configured to calculate a threshold value based, at least in part, on the datum and a bandwidth capacity of the network at the time. The use identification module is configured to receive the threshold value from the threshold calculation module. The use identification module is also configured to receive a usage value associated with bandwidth use of a compute device from the set of compute devices and associated with a time period immediately preceding the time. The use identification module is further configured to compare the usage value with the threshold value to determine a usage category associated with the compute device. The rate limiting module is configured to receive an indication of the usage category from the use identification module. The rate limiting module is also configured to limit bandwidth use of the network for the compute device based on the indication.

In some embodiments, a non-transitory processor-readable medium stores code that represents instructions to be executed by a processor. The code includes code to cause the processor to receive, at a time, a signal associated with use of a network by a compute device associated with a user. The code also includes code to cause the processor to calculate a first usage value based, at least in part, on the signal associated with use of the network. The first usage value is associated with bandwidth use (1) of the user for a first time period immediately preceding the time and (2) associated with the network. The code further includes code to cause the processor to calculate a second usage value based, at least in part, on the signal associated with use of the network. The second usage value is associated with bandwidth use (1) of the user for a second time period immediately preceding the time and (2) associated with the network. The first time period, is different from the second time period. The code further includes code to cause the processor to compare the first usage value and the second usage value with a value of a threshold associated with usage of the network at the time to determine a usage category associated with the user. The code also includes code to cause the processor to send a signal to limit bandwidth use of the user in the network for a time period after the time based, at least in part, on the usage category.

In some embodiments, a non-transitory processor-readable medium stores code that represents instructions to be executed by a processor. The code includes code to cause the processor to receive, at a first time, a first datum associated with use of a network by a set of compute devices using the network. The code also includes code to cause the processor to calculate a first threshold value based, at least in part, on the first datum and a bandwidth capacity of the network at the first time. The code further includes code to cause the processor to receive a first usage value associated with bandwidth use of the network of a compute device from the set of compute devices for a time period immediately preceding the first time. The code further includes code to cause the processor to send, at a second time after the first time, a signal to limit bandwidth use in the network of the compute device based, at least in part, on the first threshold and the first usage value. The code also includes code to cause the processor to receive, at a third time after the second time, a second datum associated with use of the network by the set of compute devices using the network. The code also includes code to cause the processor to calculate a second threshold value based, at least in part, on the second datum and a bandwidth capacity of the network at the third time. The second threshold is different from the first threshold. The code further includes code to cause the processor to receive a second usage value associated with bandwidth use of the network of the compute device for a time period immediately preceding the third time. The second usage value is substantially equal to the first usage value. Because the threshold has decreased, the bandwidth use of the compute device for the time period immediately preceding the third time is no longer deemed to be excessive and/or offending. The code also includes code to cause the processor to send, at a fourth time after the third time, a signal to not limit bandwidth use in the network of the compute device based, at least in part, on the second threshold and the second usage value.

As used herein, the singular forms "a," "an" and "the" include plural referents unless the context clearly dictates otherwise. Thus, for example, the term "a compute device" is intended to mean a single compute device or a combination of compute devices (e.g., mobile devices with access to a certain network, etc.).

FIG. 1 is a schematic block diagram of a computer system in which dynamic bandwidth allocation can be performed, according to an embodiment. The computer network system 100 includes at least one compute device 101a-101n, a bandwidth management platform 103, and at least one gateway device 109, which can be operatively coupled to one or more compute devices 101a-101n or other gateway devices 109 via a communication network 105. Note that while the bandwidth management platform 103 is shown in FIG. 1 as being within the gateway device 109, in other embodiments, the bandwidth management platform (or a portion thereof) can be operatively coupled to the gateway device 109 via the communication network 105 and/or the Local Area Network 107. Any of the devices or platforms of the computer network system 100 can be equipped with local memory/storage spaces (shown as memory 121a-121n and memory 125 in FIG. 1). Furthermore, the devices and platforms of the system 100 may have access to centralized or distributed memory/storage spaces (not shown in FIG. 1) through the communication network 105. Additionally, a compute device 101a-101n and a gateway device 109 each can include one or more processors, performing processes associated with the services provided to the compute devices 101a-101n (shown as processors 119a-119n and processor 123 in FIG. 1). For example, the bandwidth management platform 103 can be stored in the memory 125 and executed at the processor 123, as described in further detail herein. Thus, FIG. 1 is merely an example illustrating the types of devices and platforms that can be included within a computer network system 100.

In some embodiments, the gateway device 109 can be in communication with any number of compute devices 101a-101n via a Local Area Network (LAN) 107. In such embodiments, the gateway device 109 can further be configured to communicate with a wide area network (WAN) or the Internet (shown as the communication network 105). The gateway device 109 can facilitate communication between the compute devices 101a-101n and/or any other compute device with LAN 107, with any compute device 130 (e.g., personal computers, mobile devices, web servers, file servers and/or the like) operatively coupled to the gateway 109 via the communication network 105. The bandwidth management platform 103 can allocate bandwidth to the compute devices 101a-101n via the gateway device 109, based on bandwidth characteristics further described herein with respect to FIG. 2.

Communication network 105 can be any communication network, such as the Internet, operatively and communicatively coupling the compute device 101a-101n and/or the gateway device 109 with another compute device 130 (e.g., personal computers, mobile devices, web servers, file servers and/or the like). Communication network 105 can be any network or combination of networks capable of transmitting information (e.g., data and/or signals) and can include, for example, a telephone network, an Ethernet network, a fiber-optic network, a wireless network, a cellular network and/or the like.

In some instances, communication network 105 and/or LAN 107 can include multiple networks operatively coupled to one another by, for example, network bridges, routers, switches and/or gateways. For example, the compute device 101a-101n can be operatively coupled to a cellular network; and the gateway device 109 and/or the bandwidth management platform 103 can be operatively coupled to a fiber-optic network. The cellular network and fiber-optic network can each be operatively coupled to one another via one or more network bridges, routers, switches, and/or gateways such that the cellular network and the fiber-optic network are operatively coupled to form a communication network. Alternatively, the cellular network and fiber-optic network can each be operatively coupled to one another via one or more additional networks. For example, the cellular network and the fiber-optic network can each be operatively coupled to the Internet such that the cellular network, the fiber-optic network and the Internet are operatively coupled to form a communication network.

As illustrated in FIG. 1, the compute device 101a-101n is operatively coupled to communication network 105 via LAN 107 and network connection(s) 111 and 113; gateway device 109 is operatively coupled to communication network 105 via network connection(s) 117; and the compute device 130 is operatively coupled to communication network 105 via network connection(s) 115. Network connections 111, 113, 115, and 117 can be any appropriate network connection for operatively coupling compute device 101a-101n, gateway device 109, and the compute device 130.

A network connection can be a wireless network connection such as, for example, a wireless fidelity ("Wi-Fi") or wireless local area network ("WLAN") connection, a wireless wide area network ("WWAN") connection, a Virtual Private Network (VPN), and/or a cellular connection. A network connection can be a wired connection such as, for example, an Ethernet connection, a digital subscriber line ("DSL") connection, a broadband coaxial connection, and/or a fiber-optic connection.

As mentioned above, in some instances, a computer network system 100 can include more than one compute device 101a-101n, more than one bandwidth management platforms 103, and more than one gateway device 109. A compute device 101a-101n, a bandwidth management platform 103, a gateway device 109, and/or compute device 130 can be operatively coupled to LAN 107 and/or the communication network 105 by heterogeneous network connections. For example, a first compute device 101a-101n can be operatively coupled to LAN 107 and/or the communication network 105 by a WWAN network connection, another compute device 101a-101n can be operatively coupled to LAN 107 and/or the communication network 105 by a DSL network connection, and a compute device 130 can be operatively coupled to the communication network 105 by a fiber-optic network connection. The gateway device 109 can be, for example, an access point configured to provide access to the communication network 105 for the compute device 101a-101n via LAN 107.

Figure 2:
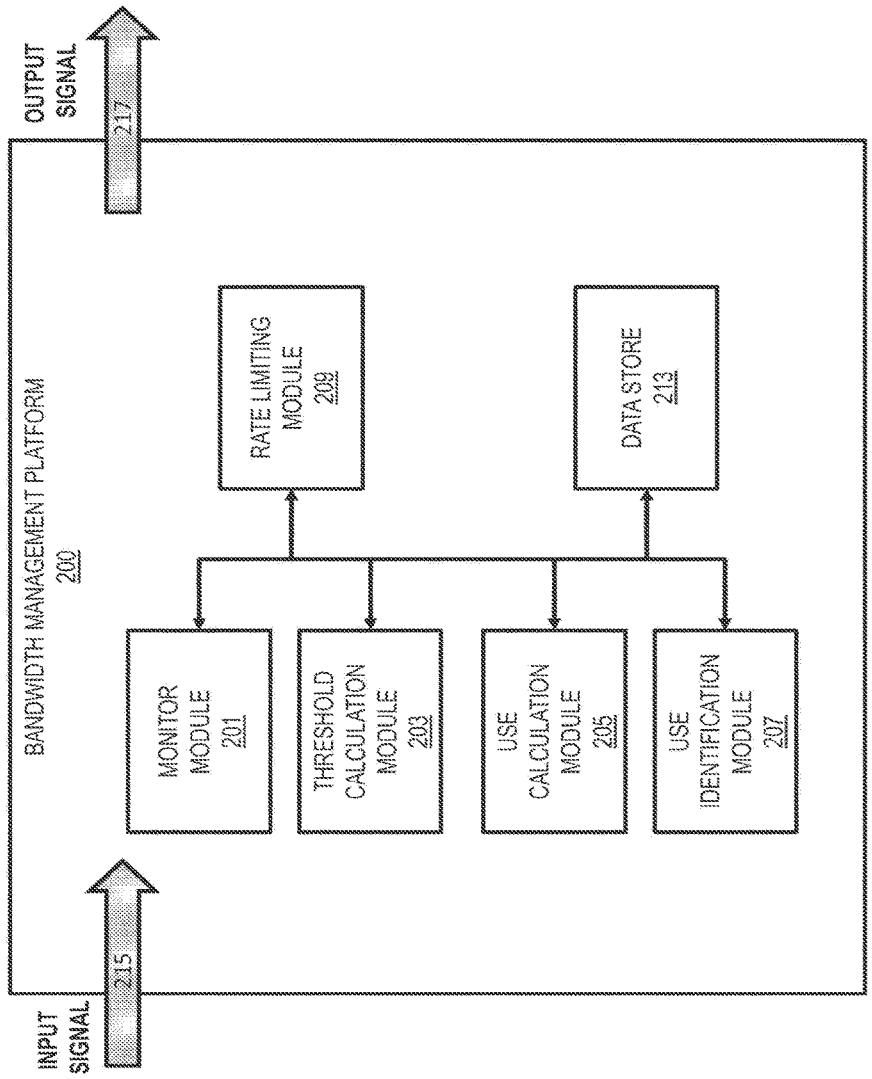
FIG. 2 is a schematic illustration of a bandwidth allocation platform, according to an embodiment.

In some embodiments, the gateway device 109 can include a set of modules (e.g., the bandwidth management platform 103) configured to perform a set of tasks. The modules can be software modules (e.g., stored in memory and executed by a processor), hardware modules, and/or any combination thereof. Such modules can include, for example, the bandwidth management platform 103 and its associated modules (as shown in FIG. 2), a module used to convert a data packet from a format of the LAN 107 to a format of the communication network 105 and vice versa, and/or the like. Additionally, because the gateway device 109 includes a module used to convert a data packet from a LAN 107 to a format of the communication network 105 (and vice versa), in some embodiments, the gateway device 109 can have a first interface operatively coupled to the LAN 107 using a first network medium and/or employing a first message transport type or protocol and a second interface operatively coupled to the communication network 105 using a second network medium and/or employing a second message transport type or protocol. In other embodiments, the LAN 107 and the gateway device 109 can use a common network medium and/or message transport type.

The compute devices 101a-101n can be any of a variety of compute devices that can be operatively coupled to communication network 105. A compute device 101a-101n can be, for example, a personal computer, a tablet computer, a personal digital assistant (PDA), a cellular telephone, a Television, a portable/mobile internet device, a network enabled sensor (e.g., thermostat), a group of computing devices, servers, and/or any other device or group of devices capable of sending and/or receiving communication signals via a network. In some embodiments, the compute device 101a-101n can include a web browser configured to access a webpage or website accessible via the gateway device 109 over communication network 105. The compute device 101a-101n can be configured to support, for example, HTML using JavaScript. For example, the compute device 101a-101n can include a web browser, such as, Firefox, Safari, Dolphin, Opera and Chrome. An Internet page or website (e.g., hosted by compute device 130) can be accessed by a user of a web browser at a compute device 101a-101n by providing the web browser with a reference such as a uniform resource locator (URL), for example, of a webpage. For example, a user of a compute device 101a-101n can access the compute device 130 via the gateway device 109 using a URL designated for the compute device 130. In some instances, compute device 101a-101n can include specialized software for accessing a server (e.g., compute device 130) connected to the communication network 105 other than a browser, such as, for example, a specialized network-enabled application or program (e.g., FTP program, peer-to-peer file sharing software, online chat software, etc.).

A compute device 101a-101n can also include a display, monitor or user interface (not shown in FIG. 1), a keyboard, various ports (e.g., a USB port), and other user interface features, such as, for example, digital pens, mice, touch screen controls, audio components, and/or video components (each not shown). A compute device 101a-101n can be operatively coupled to communication network 105 via a user interface and network connections 111 and 113.

The memory 121a-121n of the compute device 101a-101n can be, for example, a random access memory (RAM), a memory buffer, a hard drive, a read-only memory (ROM), an erasable programmable read-only memory (EPROM), and/or so forth. In some embodiments, the memory 121a-121n of the compute device 101a-101n stores instructions to cause the processor 119a-119n to execute modules, processes, and/or functions associated with using a personal computer application, a mobile application, an internet web browser, a peer-to-peer network or file share, and/or the like. In some embodiments, the memory 121a-121n stores instructions to cause the processor 119a-119n to send signal information to a display (not shown in FIG. 1).

The processor 119a-119n of the compute device 101a-101n can be any suitable processing device configured to run and/or execute a set of instructions or code. For example, the processor 119a-119n can be a general purpose processor, a central processing unit (CPU), an accelerated processing unit (APU), and/or the like. As described above, the processor 119a-119n can be configured to run and/or execute a set of instructions or code stored in the memory 121a-121n associated with using a personal computer application, mobile application, an internet web browser, and/or the like. Additionally, in some embodiments, the processor 119a-119n can run and/or execute a set of instructions associated with sending and/or receiving information to a server via the gateway device 109.

The compute device 101a-101n can include a network interface (not shown in FIG. 1). The network interface can be any suitable network interface configured to communicate with a LAN 107 and/or a communication network 105. For example, the network interface can be a network card configured to communicate with LAN 107 and/or the communication network 105 via a wired or wireless connection.

In some embodiments, the gateway device 109 can function as, for example, a network management device. The memory 125 included in the gateway device 109 can be, for example, a random access memory (RAM), a memory buffer, a hard drive, a read-only memory (ROM), an erasable programmable read-only memory (EPROM), and/or so forth. In some embodiments, the memory 125 of the gateway device 109 includes a set of instructions executed by the processor 123, provided by the bandwidth management platform 103, to allocate a given amount of network bandwidth for use by the compute device 101a-101n. In some embodiments, the gateway device 109 can operatively couple the compute devices 101a-101n associated with the LAN 107 to the communication network 105.

The processor 123 can be any suitable processor such as, for example, a general purpose processor, a central processing unit (CPU), a network processor, a front end processor, and/or the like. As such, the processor 123 is configured to perform a set of instructions stored in the memory 125.

FIG. 2 is a schematic illustration of a bandwidth management platform 200, according to an embodiment. The bandwidth management platform 200 can be structurally and/or functionally similar to the bandwidth management platform 103 of FIG. 1. As shown in FIG. 2, the bandwidth management platform 200 can include a monitor module 201, a threshold calculation module 203, a use calculation module 205, a use identification module 207, a rate limiting module 209, and a data store 213. Furthermore, the bandwidth management platform 200 can communicate with other components of a computer network system (e.g., computer network system 100 of FIG. 1) via input signals 215 and output signals 217.

In various instances, the bandwidth management platform 200 and its components may be located anywhere within a communication network system 100 including, but not limited to, within the gateway device 109, or in separate locations within the communication network system 100 of FIG. 1.

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

The bandwidth management platform 200 can provide bandwidth management for compute devices (e.g., compute devices 101a-101n of FIG. 1). In some embodiments, the bandwidth management platform 200 can be configured to communicate with the communication network 105 and can receive a signal from the compute devices 101a-101n, from the gateway device 109, and/or any other device(s) in communication with the communication network 105 associated with a given network or communication protocol (e.g., Internet Protocol or a similar messaging or signaling system, Transmission Control Protocol (TCP), User Datagram Protocol (UDP), File Transfer Protocol (FTP), Simple Mail Transfer Protocol (SMTP), Hyper Text Transmission Protocol (HTTP), Internet Message Access Protocol (IMAP), Peer Distributed Transfer Protocol (PDTP), BitTorrent, and/or the like).

The data store 213 can be, for example, a random access memory (RAM), a memory buffer, a hard drive, a read-only memory (ROM), an erasable programmable read-only memory (EPROM), a database and/or so forth. In some embodiments, the data store 213 can store data associated with bandwidth use of the compute devices 101a-101n and/or data from the other portions of the bandwidth management platform 103, as described in further detail herein.

In some embodiments, the monitor module 201 monitors network traffic between the LAN 107 and the communication network 105 (e.g., electronic signals associated with any of the aforementioned protocols) through, for example, an Internet gateway. In such embodiments, the monitor module 201 can periodically monitor a user's activities regarding bandwidth consumption. For example, the monitor module 201 can monitor network traffic (e.g., data packets) that passes through the gateway device 109 (e.g., between a compute device 101a-101n and the communication network 105). The monitor module can then classify this data based on the source and/or destination compute device 101a-101n of that data packet. In such a manner the monitor module 201 can determine bandwidth consumption of the link 117 (between the gateway device 109 and the communication network 105) on a per compute device 101a-101n basis. In some embodiments, the monitor module 201 monitors and/or stores (e.g., in data store 213) a transient record to track metrics for a user of a compute device 101a-101n. This record can be retained in the data store 213 for the duration of the session of the user and can be discarded when the user's access and/or session is terminated. Similarly, in some embodiments, the gateway device 109 can monitor and/or determine bandwidth consumption of the link 113 (between the gateway device 109 and the LAN 107) on a per compute device 101a-101n basis.

In some embodiments, the monitor module 201 can also monitor, collect and/or receive information associated with a total amount of bandwidth available between the compute devices 101a-101n and the communication network 105. For example, the monitor module 201 can receive and/or compute information associated with a maximum amount of available bandwidth for a given time period (e.g., one hour). Similarly stated, the monitor module 201 can determine an amount of bandwidth the compute devices 101a-101n can collectively use to access the communication network 105.

In some embodiments, the monitor module 201 can store the monitored and/or collected data in the data store 213. For example, the monitor module 201 can send a signal to the data store 213 to store a maximum available bandwidth value. Additionally, the monitor module can send a signal to the data store 213 to store data associated with the bandwidth used by each compute device 101a-101n, groups and/or categories of compute devices 101a-101n, and/or the like. In other embodiments, the monitor module 201 can also provide this data to one or more of the other modules within the bandwidth management platform 200.

In some embodiments, the threshold calculation module 203 can calculate one or more bandwidth usage thresholds that can be used to limit the bandwidth of specific compute devices 101a-101n, as described in further detail herein. Specifically, the threshold calculation module 203 can receive the data associated with an available bandwidth for the compute devices 101a-101n from the monitor module 201 and/or from the data store 213. Additionally, the threshold calculation module 203 can receive an indication of an amount of the available bandwidth being collectively used by the compute devices 101a-101n for a specific time period from the monitor module 201 and/or from the data store 213. In some embodiments, the threshold calculation module 203 can also receive data associated with a number of compute devices 101a-101n accessing the communication network 105 via the gateway device 109, a number of compute devices 101a-101n classified in a specific usage category (as described in further detail herein), a number of compute devices 101a-101n currently being rate limited, a percentage of bandwidth used by compute devices 101a-101n classified in one or more usage categories, a priority associated with a compute device 101a-101n (as described in further detail herein), and/or the like.

Based on the received data, the threshold calculation module 203 can calculate one or more thresholds based on the received data. In some embodiments, for example, the threshold calculation module 203 can calculate an upper threshold and/or a lower threshold. In some embodiments, the upper threshold can be calculated based on a percentage of total bandwidth used by the compute devices 101a-101n classified in a fourth category (as described in further detail herein). In such a manner, the threshold calculation module 203 can calculate the upper threshold such that a percentage (e.g., 30%, 50%, 70%, etc.) of total bandwidth can be allocated to the compute devices 101a-101n classified in the fourth category, as described in further detail herein.

In some embodiments, the lower threshold can be calculated as a percentage of the upper threshold (e.g., 33%). In other embodiments the threshold calculation module 203 can calculate the upper threshold and/or the lower threshold using data associated with a number of compute devices 101a-101n accessing the communication network 105 via the gateway device 109, a number of compute devices 101a-101n classified in a specific usage category (as further described in detail herein), a number of compute devices 101a-101n currently being rate limited, a percentage of bandwidth used by compute devices 101a-101n classified in one or more usage categories, a previous threshold, and/or the like. In some embodiments, the threshold calculation module 203 can store the threshold value(s) in the data store 213.

In some embodiments, the thresholds can deviate variably depending on the number of compute devices 101a-101n that are being throttled and also the total bandwidth capacity of the communication network 105 at a given time, as described in further detail herein. For example, a threshold can increase when a greater number of compute devices are rate limited. For another example, the threshold can decrease as the available network capacity increases.

In some embodiments, the thresholds can be periodically and/or continually updated. In such embodiments, the threshold calculation module 203 can periodically and/or continuously receive data (as discussed above) and can revise and/or update the threshold values. In such embodiments, the threshold calculation module 203 can update and/or revise threshold values stored in data store 213.

In some embodiments, the use calculation module 205 calculates information associated with bandwidth usage of the compute devices 101a-101n. Specifically, the use calculation module 205 can receive data associated with bandwidth use of a compute device 101a-101n from the monitor module 201 and/or the data store 213. Based on the data, the use calculation module 205 can calculate one or more usage values associated with the bandwidth use of the compute device 101a-101n. For example, the use calculation module 205 can periodically and/or continuously calculate an average amount of bandwidth use for a compute device 101a-101n, based on data provided by the monitor module 201.

In some embodiments, the use calculation module 205 can periodically and/or continuously calculate an average amount of bandwidth use of a compute device (e.g., the compute device 101a-101n) for a predetermined time period (e.g., 10 seconds). In addition, a bandwidth use for a time period can periodically and/or continuously be determined by the use calculation module 205 for a compute device 101a-101n for a second predetermined time period, less than the first predetermined time period (e.g., 1 second). In some embodiments, the use calculation module 205 can track bandwidth use for a specific compute device 101a-101n for several rolling windows of time such as, for example, a short term (10 seconds), a medium term (1 minute), a long term (5 minutes), etc. In some embodiments, the use calculation module 205 can store the usage values in the data store 213.

In some embodiments, the use calculation module 205 can aggregate metrics collected for individual users of compute devices 101a-101n by the monitor module 201. This enables the use calculation module 205 to determine the bandwidth load at a time and to track local maximums (high water mark) marking peak throughput on a periodic basis. Tracking the variability of local maximums by the use calculation module 205 enables the bandwidth management platform 200 to estimate actual maximum bandwidth service levels permitted by the gateway device 109. The use calculation module 205 can store the calculation results in data store 213.

In some embodiments, the use identification module 207 can assign a use category to each compute device 101a-101n using the usage values associated with that compute device 101a-101n and the threshold values. The use identification module 207 can receive the usage values for each compute device 101a-101n from the use calculation module 205 and/or data store 213. Specifically, the use identification module 207 can receive usage values associated with one or more time periods (e.g., rolling windows) of bandwidth usage for each compute device 101a-101n (or a subset of the compute devices 101a-101n currently accessing the communication network 105).

Additionally, the use identification module 207 can receive one or more threshold values from the threshold calculation module 203. In some embodiments, the use identification module 207 can receive, for example, an upper threshold and a lower threshold. In other embodiments, the use identification module 207 can receive any number of threshold values.

Using the usage value(s) and the threshold value(s), the use identification module 207 can classify the network traffic associated with (e.g., sent from and/or to) each compute device 101a-101n based on the bandwidth usage characteristics as a function of total available bandwidth, for example, into multiple bandwidth use categories. Similarly stated, in some embodiments, the use identification module 207 can group the compute devices 101a-101n into multiple categories based on the usage values associated with each compute device 101a-101n and the thresholds. In some embodiments, for example, the use identification module 207 can group the compute devices 101a-101n into four categories. In some embodiments, the use identification module 207 can store an indication of a use value associated with a compute device 101a-101n in the data store 213.

In some embodiments, a first usage category can be defined to include compute devices 101a-101n that use little or no bandwidth during a time period. In some embodiments, the first usage category is associated with a low activity or inactive usage pattern. A compute device 101a-101n is categorized in the first usage category when the compute device 101a-101n is consuming little or no bandwidth over a period of time. This activity type is typical of a compute device 101a-101n at rest but with applications periodically polling a server (e.g., compute device 130) to check status, such as checking for new mail messages, or keeping telnet or Secure Shell (SSH) connections alive. This usage pattern of the compute device 101a-101n has little impact on the communication network 105, but can be occasionally sensitive to delay, for example, if receiving a response at the compute device 101a-101n from an email server takes a long time.

In some embodiments, the use identification module 207 classifies a compute device 101a-101n in the first usage category if, for example, a usage value associated with bandwidth use for a short duration (e.g., 1 second) and a usage value associated with bandwidth use for a long duration (e.g., 1 minute) are both less than a lower threshold calculated by the threshold calculation module 203. Similarly stated, if the compute device 101a-101n includes a first usage value and a second usage value less than the lower threshold, the use identification module 207 can identify a use pattern of the compute device 101a-101n as being within the first usage category.

In some embodiments, a second usage category can be defined to include compute devices 101a-101n that use a large amount of bandwidth for a short period of time but use a smaller amount of bandwidth over a longer period of time. For example, in some embodiments, the first bandwidth usage category can include electronic devices 101a-101n that transmit and/or receive short, relatively infrequent bursts of data that use a large amount of bandwidth for a short period of time. Such network traffic can be associated with, for example, surfing the World Wide Web, clicking on links to load pages, submitting forms, checking for new or unread e-mail, downloading e-mails with small to medium size attachments, and/or the like. Such traffic uses a relatively high bandwidth usually for less than 10 seconds with a period of inactivity between bursts. This type of use is interactive, and round trip reply time is important for positive user experience. While the bandwidth used over a period of time is low, there are periodic bursts of very high bandwidth use lasting from, for example, one second to as much as, for example, 20 seconds.

In some embodiments, the use identification module 207 classifies a compute device 101a-101n in the second usage category if, for example, a usage value associated with bandwidth use for a short duration (e.g., 1 second) is greater than an upper threshold, but a usage value associated with bandwidth use for a long duration (e.g., 1 minute) is less than a lower threshold. Similarly stated, if the compute device 101a-101n includes a first usage value (associated with a short predetermined time period) greater than an upper threshold and a second usage value (associated with a long predetermined time period) less than the lower threshold, the use identification module 207 can identify a use pattern of the compute device 101a-101n as being within the second usage category.

In some embodiments, a third usage category can be defined to include compute devices 101a-101n that use a low to medium amount of bandwidth for both a short period of time and over a longer period of time. For example, in some embodiments, the third usage category can include compute devices 101a-101n that transmit and/or receive a relatively consistent low to medium amount of data over a long period of time. This can include network traffic associated with, for example, streaming audio and/or video, and/or using applications that have options to employ rate-controlled upload such as, for example, Dropbox. Bandwidth use indicative of the third usage category is relatively constant for some period of time, but is self-limiting by its own nature. Because much of this type of traffic is real-time and based on User Datagram Protocol (UDP), an application may not retry transfers and quality may suffer as a result of dropped packets.

In some embodiments, the use identification module 207 classifies a compute device 101a-101n in the third usage category if, for example, both a usage value associated with bandwidth use for a short duration (e.g., 1 second) and a usage value associated with bandwidth use for a longer duration (e.g., 1 minute) are greater than a lower threshold but less than an upper threshold. Similarly stated, if the compute device 101a-101n includes both a first usage value (associated with a short predetermined time period) and a second usage value (associated with a long predetermined time period) greater than a lower threshold but less than the upper threshold, the use identification module 207 can identify a use pattern of the compute device 101a-101n as being within the third usage category.

In some embodiments, a fourth usage category can be defined to include user devices 101a-101n that use a high amount of bandwidth for both a short period of time and over a longer period of time. Such network traffic can be associated with, for example, file transfers, peer-to-peer file sharing and/or downloading large mail attachments. In some embodiments, such network traffic can be associated with a large amount of data being transferred using a guaranteed protocol such as, for example, Transmission Control Protocol (TCP). This type of traffic tends to use available bandwidth because of the nature of the TCP rate-matching algorithm. This type of traffic is not usually interactive nor is it real-time. Instead, a large amount of data is transferred, and the user has an expectation that data transfer will need time. The guaranteed delivery property of TCP causes the lost packets to be re-transmitted if they are lost or delayed. This type of bandwidth use may last from, for example, a minute to, for example, many hours until the transfer is completed. It takes only a few compute devices 101a-101n using such applications to cause network congestion such that the experience of other users is negatively affected.

In some embodiments, the use identification module 207 classifies a compute device 101a-101n in the fourth usage category if, for example, both a usage value associated with bandwidth use for a short duration (e.g., 1 second) and a usage value associated with bandwidth use for a longer duration (e.g., 1 minute) are greater than a lower threshold and an upper threshold. Similarly stated, if the compute device 101a-101n includes both a first usage value (associated with a short predetermined time period) and a second usage value (associated with a long predetermined time period) greater than both a lower threshold and an upper threshold, the use identification module 207 can identify a use pattern of the compute device 101a-101n as being within the fourth usage category.

While described above as classifying compute devices 101a-101n into four categories based on two thresholds and two usage values, in other embodiments, the use identification module 207 can classify a compute device 101a-101n into any number of categories using any number of thresholds and/or usage values associated with that compute device 101a-101n.

In some embodiments, the rate limiting module 209 can limit and/or throttle data transfer through the gateway device 109 for one or more compute devices 101a-101n based on the usage category of that compute device 101a-101n. Specifically, the rate limiting module 209 can receive an indication of a use category assigned to a compute device 101a-101n from the use identification module 207 and/or the data store 213. Based on the usage category, the rate limiting module 209 can limit and/or throttle data transfer for that compute device 101a-101n.

In some embodiments, for example, the rate limiting module 209 can limit and/or throttle data transfer through the gateway device 109 for each compute device 101a-101n classified in the fourth usage category. In such embodiments, the rate limiting module 209 can allow non-rate limited data transfer through the gateway device 109 for the compute devices 101a-101n classified in the first usage category, the second usage category or the third usage category.

In this manner, the gateway device 109 can permit the network traffic of the first, second and third usage categories through the gateway without limiting the speed of the data transfer. For example, even though the bandwidth use of the compute devices 101a-101n classified in the second usage category can be relatively high, the high bandwidth use occurs for a short period of time with a relatively long duration of time between bursts. Therefore, the overall impact on the network is minimal because the average bandwidth consumed over time is relatively low. For example, the stochastic nature of web surfing is such that the bandwidth of the type of traffic associated with the second usage category is not limited because requests for pages are generally random and staggered across multiple users.

In other embodiments, the rate limiting module 209 can limit and/or throttle data transfer through the gateway device 109 for compute devices 101a-101n in categories other than the fourth category. For example, the rate limiting module 209 can limit and/or throttle data associated with compute devices 101a-101n classified in the third category as well as the fourth category. In such embodiments, the rate limiting module 209 can limit and/or throttle data in the fourth category differently (e.g., at a different rate) than data in the third category.

In some embodiments, the rate limiting module 209 can dynamically determine and/or calculate an amount to limit and/or throttle data transfer through the gateway device 109 for the compute devices 101a-101n identified and/or selected to be rate limited. Specifically, the rate limiting module 209 can select a limited data transfer rate for compute devices 101a-101n in specific categories based on any number of factors, such as, for example, the total capacity of the network, the number of compute devices 101a-101n currently rate limited and/or priorities associated with those compute devices 101a-101n (discussed further herein), the number of compute devices 101a-101n in each priority classification that are throttled, a ratio of compute devices 101a-101n that are currently rate limited to the compute devices 101a-101n that not currently rate limited, and/or the like.

In some embodiments, the data transfer rate for a compute device 101a-101n that is being limited and/or throttled can be adjusted up or down as the total network traffic changes. For example, the data transfer rate and/or limit for compute devices 101a-101n classified in the fourth usage category can increase as fewer compute devices 101a-101n send data to the communication network 105 via the gateway device 109. In some embodiments, in extreme conditions, the rate limiting module 209 may not adjust the rate limit below a certain use (e.g., 32 Kbps upload and 64 Kbps download) even in the most dire network situations. If such low levels of bandwidth become chronic, it can be a sign that the communication network 105 is oversubscribed and bandwidth service levels need to be upgraded.

In some embodiments, the rate limiting module 209 can select a data transfer rate for a compute device 101a-101n that is being limited and/or throttled based on reserving a predetermined amount of bandwidth for compute devices 101a-101n classified in a particular category. For example, the allocated bandwidth for compute devices 101a-101n of the fourth category can be a predetermined percentage (e.g., between 30% and 70%) of the total available bandwidth. Thus, the bandwidth for a particular compute device 101a-101n in the fourth category can be determined based on the selected percentage and the total number of compute devices 101a-101n in the fourth category. In other embodiments, the allocated bandwidth can be determined based, at least in part, on the number of compute devices 101a-101n sending and/or receiving packets through the gateway device 109, such that as the number of users increases the rate limiting module 209 allocates a higher total bandwidth to the compute devices 101a-101n classified in the fourth category.

In some embodiments, the rate limiting module 209 can send to the threshold calculation module 203 an indication of a number of compute devices 101a-101n classified in a specific usage category, a number of compute devices 101a-101n currently being rate limited, a percentage of bandwidth used by compute devices 101a-101n classified in one or more usage categories, and/or the like. As described above, the threshold calculation module 203 can then recalculate the thresholds based on the updated data. Thus, based on the dynamic thresholds, the use identification module 207 can classify the compute devices 101a-101n differently as the overall conditions of the bandwidth usage through the gateway device 109 changes.

In some embodiments, a compute device 101a-101n can be assigned a priority value, which can affect the decision to rate limit that compute device 101a-101n. For example, during a user authentication process, particular priorities can be defined for each user and that user's priority value can be associated with a compute device 101a-101n when that user logs into and/or accesses the gateway device 109 via that compute device 101a-101n. A priority value can be characterized with, for example, a number 1 to n. Higher priority classifications can be reserved for compute devices 101a-101n and/or users that should receive higher priority. For example, mission-critical systems and/or certain users (e.g., a CEO) can be assigned a high priority setting. The priority setting can be used to determine the relative handling of compute devices 101a-101n by the bandwidth management platform 200. In some embodiments, the priority assigned to a user or a compute device 101a-101n can override the category in which the compute device 101a-101n is classified. For example, a compute device 101a-101n classified in the fourth category and with a high priority, might not be rate limited based on the high priority of that compute device 101a-101n. For another example, a high priority can decrease one or more threshold values that will be applied to the usage value for that compute device 101a-101n. In such a manner, the compute device 101a-101n can use a greater amount of bandwidth prior to being classified in the fourth category. In other embodiments, the rate limiting module 209 can assign a greater percentage of the total bandwidth to use by higher priority compute devices 101a-101n than for use you lower priority compute devices 101a-101n.

Thus, as discussed above, network use data for users of compute devices 101a-101n can be periodically measured by the monitor module 201, and users can be classified among different usage patterns by the use identification module 207 (as described in FIG. 6) based on the use data. The decision to classify current use by a particular user of a compute device 101a-101n can be dynamic and depend on network conditions (e.g., using the dynamic thresholds). Network conditions as a whole are subject to change from moment to moment, as well as individual usage patterns. Thus, the thresholds can change as network conditions change. The use identification module 207 can decide how to classify any particular usage pattern depending on use relative to other use on the communication network 105 based on the dynamic thresholds. Thus, a user of a compute device 101a-101n may be classified differently depending on a combination of their own behavior combined with the network conditions as a whole, and a priority level assigned to the user and/or the compute device 101a-101n.

In some embodiments, two or more of the modules 201-209 of the bandwidth management platform 200 shown and described with respect to FIG. 2 can be combined. For example, in some embodiments, the use identification module 207 and the rate limiting module 209 can be combined into a single module. In such an example, the indication of the use category assigned to a compute device 101a-101n is not determined, sent and/or stored. Specifically, the combined module directly (e.g., without defining an indication of the use category) limits and/or throttles bandwidth based on comparing the usage values to the thresholds in a manner described above. For another example, the use calculation module 205 can be included as part of the monitor module 201.

Figure 3:
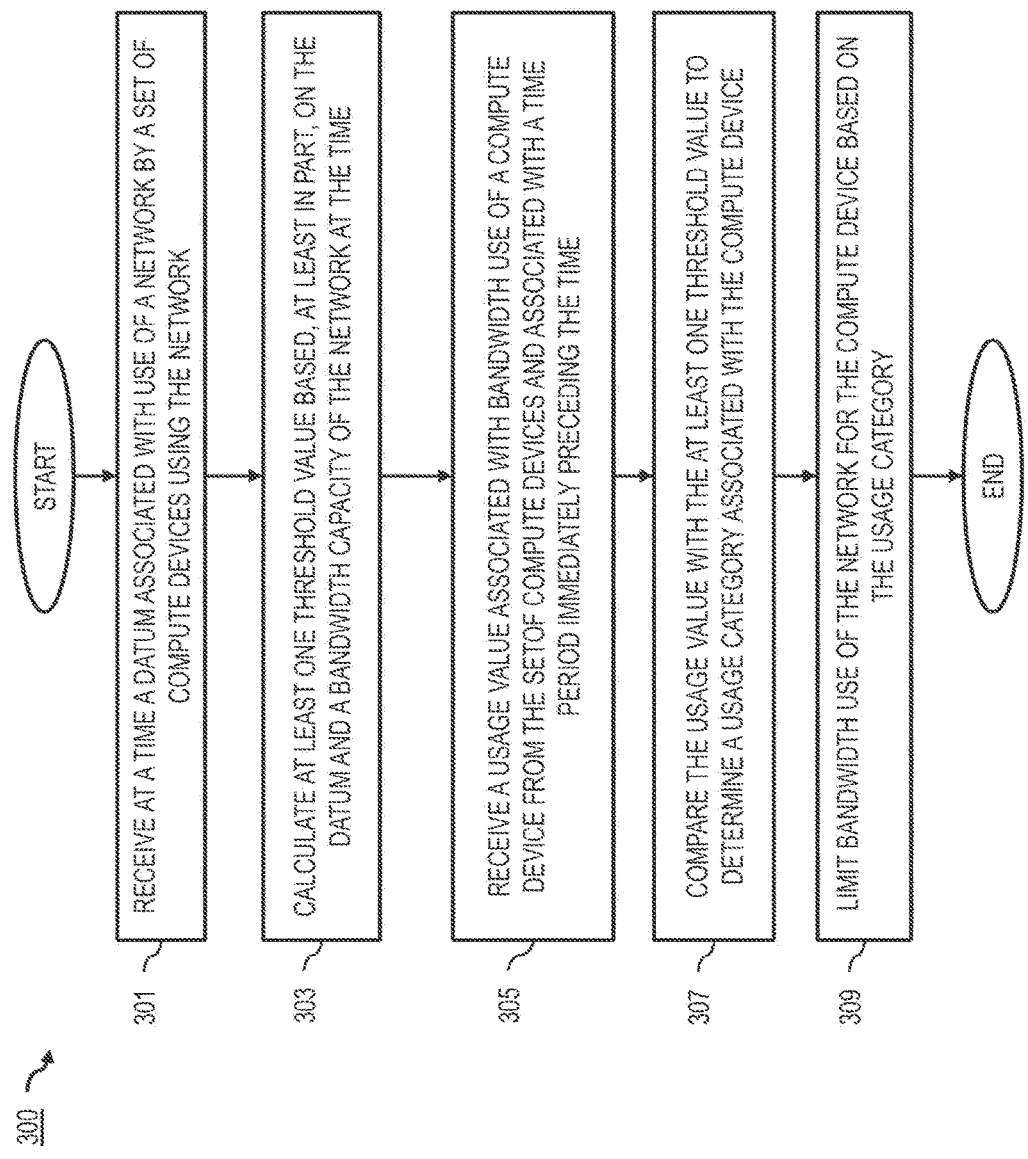
FIGS. 3-5 are flowcharts of processes for providing dynamic bandwidth, according to various embodiments.
Figure 4:
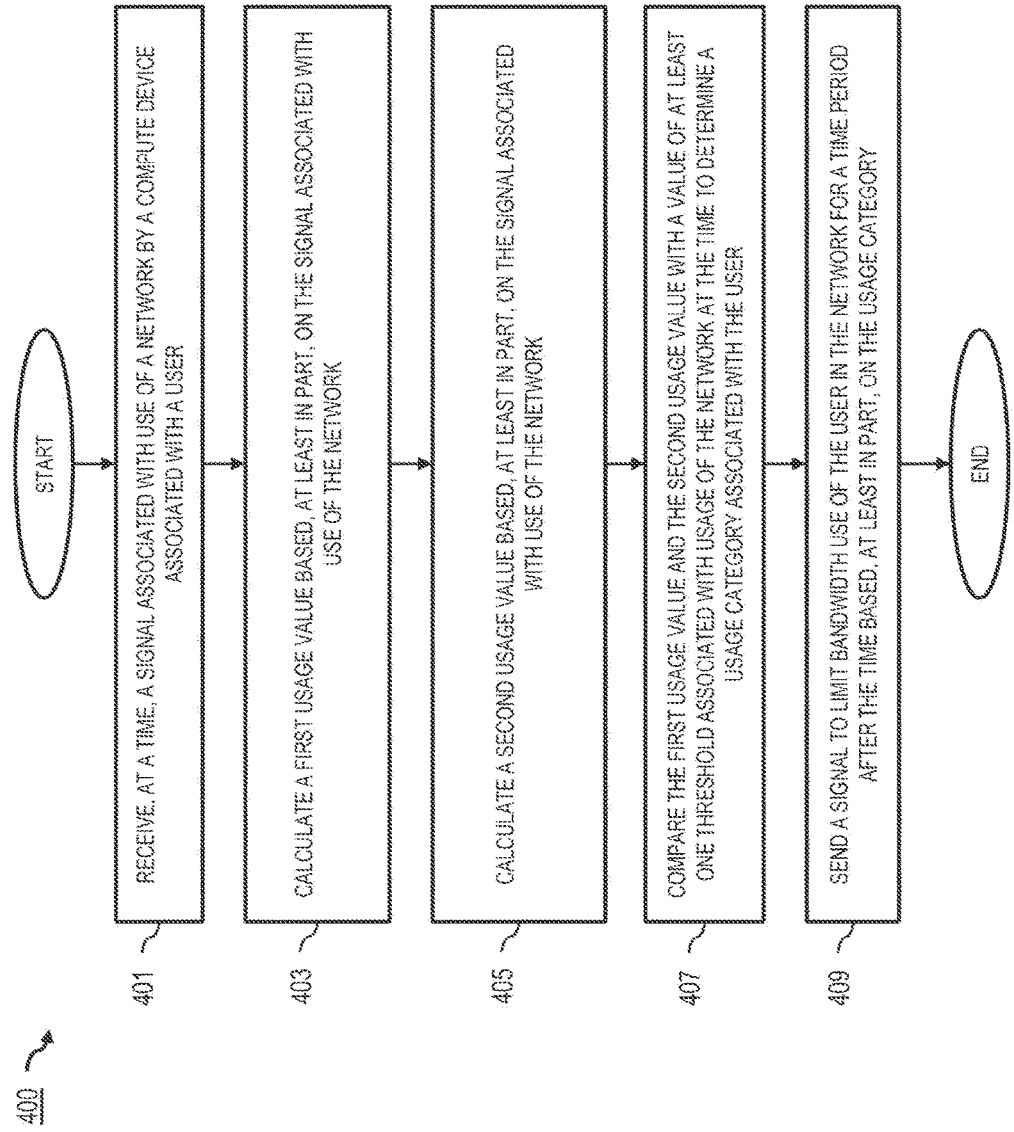
Figure 5:
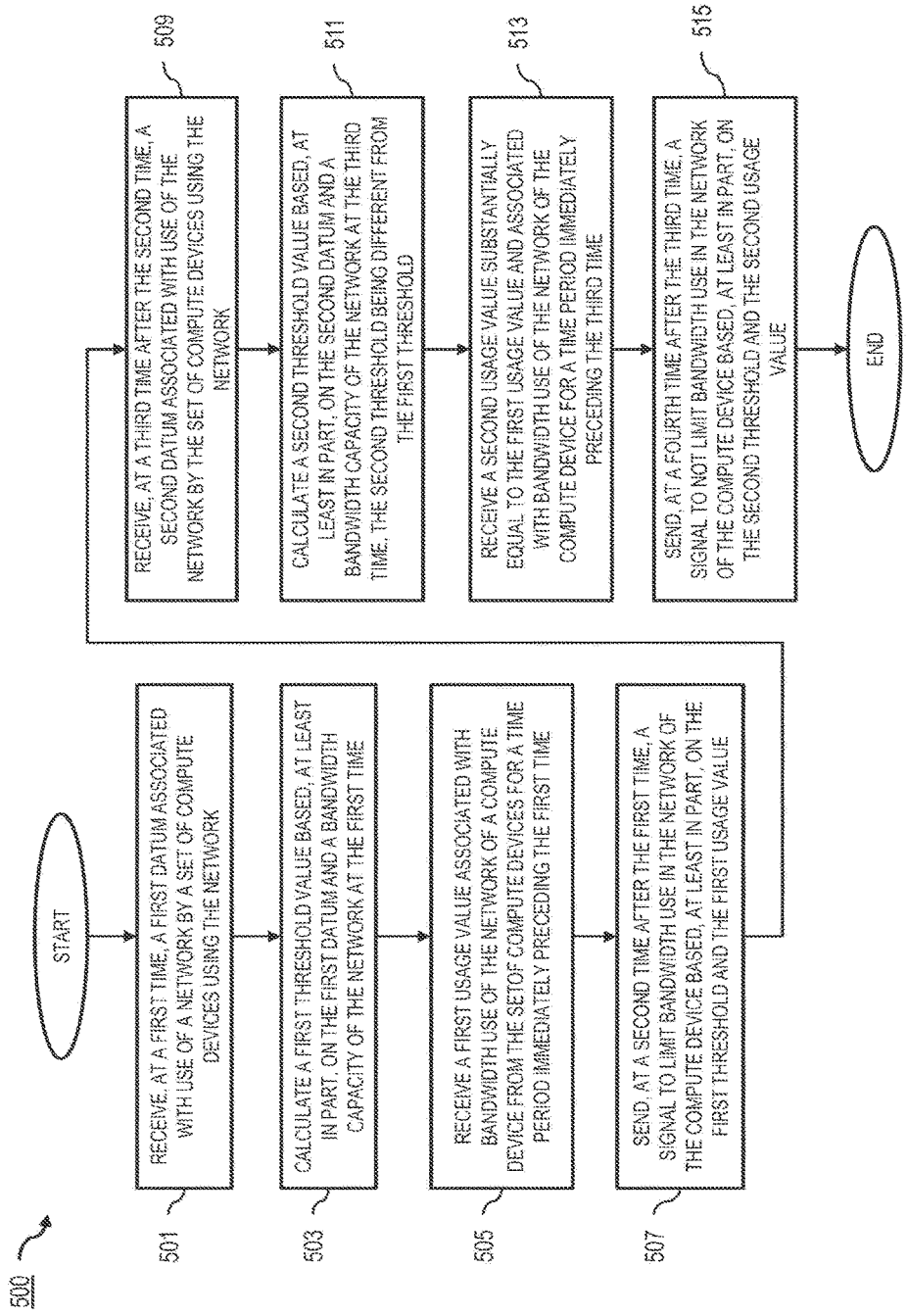

FIGS. 3-5 are flowcharts of processes for providing dynamic bandwidth, according to various embodiments. FIG. 3 shows a method 300 for allocating bandwidth based on a threshold value, according to an embodiment. At 301, the threshold calculation module 203 receives (e.g., from monitor module 201) at a time T, a datum associated with use of a network (e.g., communication network 105) by a set of compute devices 101a-101n using the communication network 105. The datum may include, for example, average bandwidth use by each compute device 101a-101n, a use profile identifier for a user, a bandwidth limit associated with a user of a compute device 101a-101n, and/or the like. The datum can also include a number of compute devices 101a-101n from the set of compute devices. In some embodiments, a monitor module 201 monitors use of the communication network 105 for each compute device 101a-101n from the set of compute devices and can send the use data to the threshold calculation module 203.

At 303, the threshold calculation module 203 calculates a threshold value S1 based, at least in part, on the datum and a bandwidth capacity C of the communication network 105 at the time T. In some embodiments, the threshold value S1 can be based on data associated with a number of compute devices 101a-101n accessing the communication network 105 via the gateway device 109, a number of compute devices 101a-101n classified in a specific usage category (as described in further detail herein), a number of compute devices 101a-101n currently being rate limited, a percentage of bandwidth used by compute devices 101a-101n classified in one or more usage categories, a priority associated with a compute device 101a-101n (as described in further detail herein), and/or the like.

At 305, the use identification module 207 receives, a usage value U associated with bandwidth use of a compute device 101a-101n. The use identification module 207 can receive the use value directly from each compute device 101a-101n, and/or from the use calculation module 205. The use value U can be associated with bandwidth use by the compute device 101a-101n during a time period P1 immediately preceding the time T. In some embodiments, the use identification module 207 can also receive the threshold value S1 from the threshold calculation module 203.

In some embodiments, a use calculation module 205 receives a signal (e.g., from a monitor module 201) associated with use of the communication network 105 by the compute device 101a-101n. The use calculation module 205 can calculate the use value U based, at least in part, on the signal associated with use of the communication network 105 by the compute device 101a-101n. The use calculation module 205 can send the use value U to the use identification module 207 to be used for comparison, as described at step 307.

At 307, the use identification module 207 compares the use value U with the threshold value S1 to determine a usage category associated with the compute device 101a-101n, or for a user of the compute device 101a-101n. As previously discussed with regards to FIG. 2, a usage category can be defined based on type of network use by a compute device 101a-101n. For example, a first category can identify network traffic associated with little or no bandwidth use during a time period, a second category can identify short, relatively infrequent bursts that use a large amount of bandwidth for a short period of time, a third category can identify network traffic associated with continuous use of relatively low bandwidth, and a fourth category can identify network traffic associated with high bandwidth use for a relatively long duration. In some embodiments, the use categories can be predefined.

At 309, the rate limiting module 209 receives an indication of the usage category from the use identification module 207, for a compute device 101a-101n. The rate limiting module 209 can limit bandwidth availability of the communication network 105 for the compute device 101a-101n based on the indication. For example, if the compute device 101a-101n is categorized in the second category (infrequent large amounts of bandwidth use), the rate limiting module 209 does not limit bandwidth use of the compute device 101a-101n. For another example, if the compute device 101a-101n is categorized in the fourth category (prolonged use of large amounts of bandwidth), the rate limiting module 209 can limit bandwidth use of the compute device 101a-101n (e.g., based on a rate calculated by the rate limiting module 209). The rate limiting module 209 can limit bandwidth use of the communication network 105 at time T for a number of compute devices 101a-101n from the set of compute devices included in the datum.

In some embodiments, the rate limiting module 209 can limit bandwidth use of the communication network 105 for the compute device 101a-101n based on various factors, in addition to the category indication. For example, the rate limiting module 209 can limit bandwidth based on a priority associated with the compute device 101a-101n (for example, in a device profile or user profile). The rate limiting module 209 can also use other data to limit bandwidth. For example, the rate limiting module 209 can use number of compute devices 101a-101n from the set of compute devices and for which the rate limiting module 209 is limiting bandwidth use of the communication network 105 at time T and/or number of compute devices 101a-101n from the set of compute devices and for which the rate limiting module 209 is not limiting bandwidth use of the communication network 105 at time T. The rate limiting module 209 can also use various statistical analysis results provided by the use calculation module 205 for limiting the bandwidth use such as, for example, a ratio of a number of compute devices 101a-101n from the set of compute devices and for which the rate limiting module 209 is limiting bandwidth use of the communication network 105 at time T and a number of compute devices 101a-101n from the set of compute devices and for which the rate limiting module 209 is not limiting bandwidth use of the communication network 105 at time T.

In some embodiments, the threshold calculation module 203 can calculate a second threshold value S2 based, at least in part, on the datum and the bandwidth capacity of the communication network 105 at time T. In such embodiments, the use identification module 207 receives the first threshold value S1 and the second threshold value S2 from the threshold calculation module 203. The use identification module 207 also receives a use value associated with bandwidth use of the compute device 101a-101n and associated with a second time period P2 immediately preceding time T (e.g., from the use calculation module 205). The use identification module 207 can determine the usage category for the compute device 101a-101n, or for a user of the compute device 101a-101n, based on the first threshold S1, the second threshold S2, the use value associated with the first time period P1, and the use value associated with the second time period P2.

FIG. 4 shows a method 400 for allocating bandwidth based on a usage category, according to one embodiment. At 401, the bandwidth management platform 200 (or a module therein) receives, at a time T1, a signal associated with use of a communication network 105 by a compute device 101a-101n associated with a user. The signal may include, for example, average bandwidth use by the compute device 101a-101n, a use profile identifier for the user, a bandwidth limit associated with the user, etc.

At 403, the use calculation module 205 calculates a first usage value U1 based, at least in part, on the signal associated with use of the communication network 105. The first usage value U1 is calculated based on bandwidth use of the user for a first time period P1 immediately preceding time T1.

At 405, the use calculation module 205 calculates a second usage value U2 based, at least in part, on the signal associated with use of the communication network 105. The second usage value U2 is calculated based on bandwidth use of the user for a second time period P2 immediately preceding time T1. The first time period P1 is different from the second time period P2.

At 407, the use identification module 207 compares the first usage value U1 and the second usage value U2 with a value of at least one threshold Y1 associated with use of the communication network 105 at time T1 (the threshold value Y1 can be, for example, provided by the threshold calculation module 203). The use identification module 207 can determine a usage category associated with the user based on the comparison, as described above with regards to step 307 of FIG. 3.

In some embodiments, the value of threshold Y1 can be calculated based, at least in part, on a bandwidth capacity of the communication network 105. The value of threshold Y1 can also be calculated based on a number of users using the communication network 105 and/or priorities associated with those users.

In some embodiments, the threshold value calculated by the threshold calculation module 203 can be different at different times. For example, a value of the at least one threshold Y2 at a second time T2 after time T1 can be different from the value of the at least one threshold Y1 at time T1. Because the bandwidth capacity of the communication network 105, the number of users using the communication network 105, the users' priority and the users' category can dynamically change, a value of a threshold that is calculated based on the bandwidth capacity of the communication network 105, the number of users using the communication network 105, the users' priority and the users' category, can also dynamically change.

In some embodiments, the threshold calculation module 203 calculates the value of the at least one threshold Y1 (or Y2) based, at least in part, on a number of users using the communication network 105, for which bandwidth use of the communication network 105 is being limited at time T1 (or T2) and/or a number of users using the communication network 105 for which bandwidth use of the communication network 105 is not being limited at time T1 (or T2). For example, the threshold calculation module 203 can calculate a threshold value based on a ratio of a number of users using the communication network 105, for which bandwidth use of the communication network 105 is being limited at time T1 (or T2) and a number of users using the communication network 105 for which bandwidth use of the communication network 105 is not being limited at time T1 (or T2).

At 409, the bandwidth management platform 200 sends a signal (e.g., to a rate limiting module 209) to limit bandwidth use of the user (e.g., a compute device 101a-101n associated with the user) of the communication network 105 for a time period P3 after time T based, at least in part, on the usage category and the threshold Y1 (and/or Y2). In some embodiments, the signal to limit bandwidth use can be additionally based on a priority associated with the user or associated with the compute device 101a-101n (for example, identified in a device profile or user profile).

FIG. 5 shows a method 500 for allocating bandwidth based on a threshold and a use value, according to an embodiment. At 501, the bandwidth management platform 200 receives, at a first time, a first datum associated with use of a communication network 105 by a set of compute devices 101a-101n. The first datum may include, for example, average bandwidth use by each compute device 101a-101n, a use profile identifier for a user of a compute device 101a-101n, a bandwidth limit associated with a user of a compute device 101a-101n, etc. The first datum can also include a number of compute devices 101a-101n from the set of compute devices.

At 503, the threshold calculation module 203 calculates a first threshold value based, at least in part, on the first datum and a bandwidth capacity of the communication network 105 at the first time. The first datum can include a number of compute devices 101a-101n from the set of compute devices using the communication network 105 and/or any other data associated with bandwidth use of the network, as described above.

At 505, the bandwidth management platform 200 receives a first usage value associated with bandwidth use of the communication network 105 of a compute device 101a-101n from the set of compute devices for a time period immediately preceding the first time. The bandwidth management platform 200 can determine a limitation for bandwidth use based on the data received and the values received and/or calculated at steps 501-505.

At 507, the bandwidth management platform 200 sends, at a second time after the first time a signal to limit bandwidth use in the communication network 105 of the compute device 101a-101n based, at least in part, on the first threshold and the first usage value. The signal to limit bandwidth use can limit bandwidth use based, at least in part, on a priority associated with the compute device 101a-101n. In some embodiments, the first datum can include a number of compute devices 101a-101n from the set of compute devices for which the signal to limit bandwidth use is limiting bandwidth use of the communication network 105 at the first time.

At 509, the bandwidth management platform 200 receives, at a third time after the second time a second datum associated with use of the communication network 105 by the set of compute devices using the communication network 105. At 511, the threshold calculation module 203 calculates a second threshold value based, at least in part, on the second datum and a bandwidth capacity of the communication network 105 at the third time. The second threshold value is different from the first threshold value.

At 513, the bandwidth management platform 200 receives a second usage value associated with bandwidth use of the communication network 105 of the compute device 101a-101n from the set of compute devices for a time period immediately preceding the second time. In some embodiments, the time period immediately preceding the first time can have a duration substantially equal to the duration of the time period immediately preceding the second time. The time period immediately preceding the first time can be different from the time period immediately preceding the second time. Similarly, the second usage value can be substantially equal to the first usage value.

In some embodiments, the bandwidth management platform 200 can determine not to limit bandwidth use for a compute device 101a-101n. At 515, the bandwidth management platform 200 sends, at a fourth time after the third time a signal to not limit bandwidth use in the communication network 105 of the compute device 101a-101n based, at least in part, on the second threshold and the second usage value. The components 201-209 of the bandwidth management platform 200 can store received data, calculated values, etc. in the data store 213. Thus, because the second usage value is substantially equal to the first usage value, the decision to rate limit the compute device 101a-101n at the second time but not at the fourth time is based on the dynamic threshold changing based on the characteristics of the network.

In some embodiments, the threshold calculation module 203 calculate the first threshold value based, at least in part, on a number of compute devices 101a-101n from the set of compute devices for which bandwidth use of the communication network 105 is being limited at the first time, and/or a number of compute devices 101a-101n from the set of compute devices for which bandwidth use of the communication network 105 is not being limited at the first time. For example, the threshold calculation module 203 can calculate the first threshold based, at least in part, on a ratio of (1) a number of compute devices 101a-101n from the set of compute devices for which bandwidth use of the communication network 105 is being limited at the first time, and (2) a number of compute devices 101a-101n from the set of compute devices for which bandwidth use of the communication network 105 is not being limited at the first time.

While the methods 300, 400, 500 shown and described in FIGS. 3-5 are shown as having a "start" and an -end", in some embodiments, the methods 300, 400, 500 illustrate a one or more iterations of a periodic and/or continuous process. For example, after the method 300 of FIG. 3 limits bandwidth use of the network for the compute device based on the usage category at 309, the method 300 can return to step 301 and perform the method 300 to further assess the compute device and its usage category at a subsequent time. For another example, method 500 of FIG. 5 illustrates two iterations of a process. In the first iteration and at step 507, the bandwidth of the compute device is limited. In the second iteration and at step 515, the bandwidth of the compute device is not limited. Such iterations can continuously and/or periodically reassess the bandwidth use of a compute device, the total amount of bandwidth being used by the network, the amount of bandwidth available, and/or the like.

Figure 6:
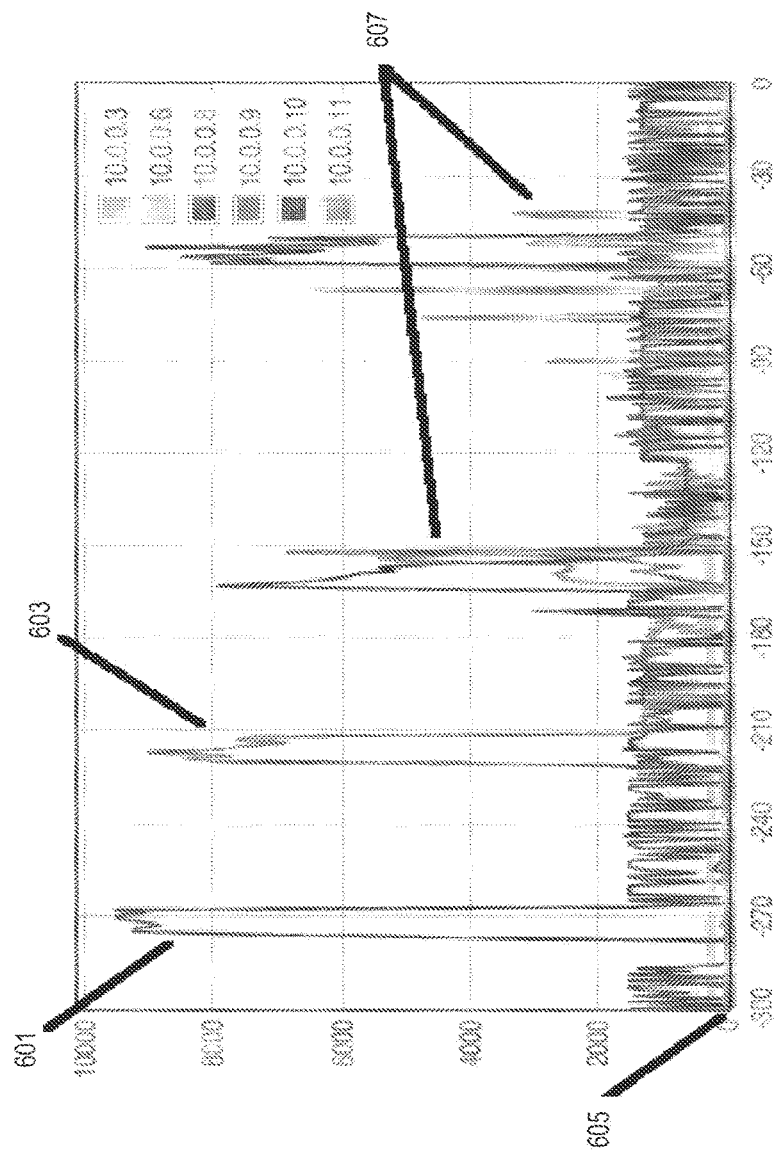
FIG. 6 is an exemplary diagram of dynamic bandwidth allocation, according to an embodiment.

FIG. 6 is an exemplary diagram of dynamic bandwidth allocation, according to an embodiment. The graph of FIG. 6 shows a number of various usage patterns as previously described. In the example of FIG. 6, the uses 601 and 603 are associated by compute devices that are being throttled dynamically as they exhibit prolonged high-bandwidth use behavior. For example, use 601 can be related to initializing a video stream that is being limited affecting download speed but not the actual viewing of the stream. The usage pattern 603 can be related to a movie download. In some embodiments, limiting use 603 can affect the speed of the download.

Limiting uses 601 and 603, allows the bandwidth management platform 200 to allocate higher levels of bandwidth to compute devices with uses 605 and 607. Thus, the compute devices associated with uses 605 and 607 can experience a higher level of performance than they would have had if the uses 601 and 603 were not limited. Use 605, for example, can represent video calls (e.g., Skype calls) and basic network monitoring tools and will not be affected by the bandwidth limitations. Use 607 can represent bursting and/or streaming traffic that can remain unaffected by bandwidth limitations because bulk traffic has been limited. As a result, users browsing the web and checking e-mail can continue to experience fast response times during heavy traffic periods, real-time and streaming data such as audio and video are not interrupted, and lower priority usage patterns such as transferring large files and peer-to-peer file sharing for a few users may take longer in order to accommodate a majority of users browsing the web and checking e-mail. As a consequence of this dynamic bandwidth management control, the overall network experience is enhanced for users while network resources are reserved for high-priority users and mission-critical systems.

Embodiments described herein discuss a bandwidth management platform 103 that can limit bandwidth between a compute device 101a-101n and a communication network 105. Note that in some embodiments, the bandwidth management platform 103 can limit data traffic sent from a compute device 101a-101n to communication network 105 (upstream traffic) and/or data traffic received from communication network and destined to the compute device 101a-101n (downstream traffic). In some embodiments, for example, the upstream traffic can be independently monitored and controlled from the downstream traffic. For example, referring to FIG. 2, the monitor module 201 can separately monitor the upstream traffic and the downstream traffic associated with a compute device 101a-101n. Similarly, the threshold calculation module 203 (FIG. 2) can calculate different thresholds for the upstream traffic and the downstream traffic of a network. For yet another example, the rate limiting module 209 can rate limit the downstream traffic of a compute device 101a-101n without rate limiting the upstream traffic of that compute device 101a-101n.

While the bandwidth management platform 103 of FIG. 1 is shown and described as being between a LAN 107 and a communication network 105, in other embodiments the bandwidth management platform can be communicatively positioned between any two devices or groups of devices. Similarly stated, the bandwidth management platform can be placed in the communication path between any two devices or groups of devices. For example, in some embodiments, the bandwidth management platform can be positioned between two disparate and separate communication networks. For another example, the bandwidth management platform can be embedded in a single communication network that has been configured such that the data traffic between a specific compute device passes through the bandwidth management platform.

It is intended that the methods and apparatus described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as, for example, produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as, for example, space or a cable). The media and computer code (also can be referred to as code) can be those designed and constructed for the specific purpose or purposes. Examples of non-transitory computer-readable media include, but are not limited to, magnetic storage media such as, for example, hard disks, floppy disks, and magnetic tape; optical storage media such as, for example, Compact Disc/Digital Video Discs (CD/DVDs), Compact Disc-Read Only Memories (CD-ROMs), and holographic devices; magneto-optical storage media such as, for example, optical disks; carrier wave signal processing modules; and hardware devices that are specially configured to store and execute program code, such as, for example, Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps can be modified. Additionally, certain steps can be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A method for facilitating a dynamic rate limit, the method being implemented by one or more processors executing computer program instructions that, when executed, perform the method, the method comprising:
   determining, for a first time period, an amount of aggregated bandwidth consumption for a set of computing devices on a network;
   determining, for the first time period, a total amount of available bandwidth on the network;
   determining a ratio of the amount of aggregated bandwidth consumption to the total amount of available bandwidth;
   determining, based on the ratio a first bandwidth threshold;
   determining a second bandwidth threshold;
   determining first bandwidth consumption of the first computing device for the first time period;
   determining second bandwidth consumption of the first computing device for a second time period of different length than the first time period; and
   dynamically setting a rate limit for a first computing device of the set of computing devices based on (i) a comparison of the first bandwidth threshold to at least one of the first bandwidth consumption or the second bandwidth consumption and (ii) a comparison of the second bandwidth threshold to at least a different one of the first bandwidth consumption or the second bandwidth consumption.

2. The method of claim 1, wherein dynamically setting the rate limit for the first computing device comprises:
   classifying the first computing device based on the comparison of the first bandwidth threshold to at least one of the first bandwidth consumption or the second bandwidth consumption; and
   dynamically setting the rate limit for the first computing device based on the classification of the first computing device.

3. The method of claim 1, wherein the first time period is greater in length than the second time period.

4. The method of claim 1, wherein the second time period is greater in length than the first time period.

5. The method of claim 1, wherein dynamically setting the rate limit for the first computing device comprises dynamically setting a rate limit for upstream traffic of the first computing device based on the comparison of the first bandwidth threshold to at least one of the first bandwidth consumption or the second bandwidth consumption.

6. The method of claim 1, wherein dynamically setting the rate limit for the first computing device comprises dynamically setting a rate limit for downstream traffic of the first computing device based on the comparison of the first bandwidth threshold to at least one of the first bandwidth consumption or the second bandwidth consumption.

7. The method of claim 1, further comprising:
determining a downstream bandwidth consumption of the first computing device, the downstream bandwidth consumption being associated with downstream traffic of the first computing device, the first bandwidth consumption of the first computing device comprising the downstream bandwidth consumption of the first computing device,
wherein dynamically setting the rate limit for the first computing device comprises dynamically setting a rate limit for upstream traffic of the first computing device based on a comparison of the first bandwidth threshold to the downstream bandwidth consumption of the first computing device.

8. The method of claim 1, further comprising:
determining a upstream bandwidth consumption of the first computing device, the upstream bandwidth consumption being associated with upstream traffic of the first computing device, the first bandwidth consumption of the first computing device comprising the upstream bandwidth consumption of the first computing device,
wherein dynamically setting the rate limit for the first computing device comprises dynamically setting a rate limit for upstream traffic of the first computing device based on a comparison of the first bandwidth threshold to the upstream bandwidth consumption of the first computing device.

9. A non-transitory, computer-readable media for facilitating a dynamic rate limit, the computer-readable media storing machine-readable instructions that, when executed, by a data processing apparatus cause the data processing apparatus to perform operations comprising:
determining an amount of aggregated bandwidth consumption for a set of computing devices on a network;
determining a total amount of available bandwidth on the network;
determining a ratio of the amount of aggregated bandwidth consumption to the total amount of available bandwidth;
determining, based on the ratio, a first bandwidth threshold;
determining a second bandwidth threshold;
determining first bandwidth consumption of a first computing device of the set of computing devices that is measured for a first time period;
determining second bandwidth consumption of the first computing device that is measured for a second time period of different length than the first time period; and
dynamically setting a rate limit for the first computing device based on (i) a comparison of the first bandwidth threshold to at least one of the first bandwidth consumption or the second bandwidth consumption and (ii) a comparison of the second bandwidth threshold to at least a different one of the first bandwidth consumption or the second bandwidth consumption.

10. The non-transitory computer-readable media of claim 9, wherein dynamically setting the rate limit for the first computing device comprises dynamically setting the rate limit for the first computing device based on (i) a comparison of the first bandwidth threshold to the first bandwidth consumption and (ii) a comparison of the second bandwidth threshold to the second bandwidth consumption.

11. The non-transitory computer-readable media of claim 9, wherein dynamically setting the rate limit for the first computing device comprises:
classifying the first computing device based on the comparison of the first bandwidth threshold to at least one of the first bandwidth consumption or the second bandwidth consumption; and
dynamically setting the rate limit for the first computing device based on the classification of the first computing device.

12. The non-transitory computer-readable media of claim 9, wherein dynamically setting the rate limit for the first computing device comprises dynamically setting a rate limit for upstream traffic of the first computing device based on the comparison of the first bandwidth threshold to at least one of the first bandwidth consumption or the second bandwidth consumption.

13. The non-transitory computer-readable media of claim 9, wherein dynamically setting the rate limit for the first computing device comprises dynamically setting a rate limit for downstream traffic of the first computing device based on the comparison of the first bandwidth threshold to at least one of the first bandwidth consumption or the second bandwidth consumption.

14. The non-transitory computer-readable media of claim 9, wherein the operations further comprise:
determining a first downstream bandwidth consumption of the first computing device that is measured for the first time period, the first downstream bandwidth consumption being associated with downstream traffic of the first computing device during the first time period; and
determining a second downstream bandwidth consumption of the first computing device that is measured for the second time period, the first downstream bandwidth consumption being associated with downstream traffic of the first computing device during the second time period,
wherein dynamically setting the rate limit for the first computing device comprises dynamically setting a rate limit for upstream traffic of the first computing device based on a comparison of the first bandwidth threshold to at least one of the first downstream bandwidth consumption or the second downstream bandwidth consumption.

15. The non-transitory computer-readable media of claim 9, wherein the operations further comprise:
determining a first upstream bandwidth consumption of the first computing device that is measured for the first time period, the first upstream bandwidth consumption being associated with upstream traffic of the first computing device during the first time period; and
determining a second upstream bandwidth consumption of the first computing device that is measured for the second time period, the first upstream bandwidth consumption being associated with upstream traffic of the first computing device during the second time period,
wherein dynamically setting the rate limit for the first computing device comprises dynamically setting a rate limit for upstream traffic of the first computing device based on a comparison of the first bandwidth threshold to at least one of the first upstream bandwidth consumption or the second upstream bandwidth consumption.

16. A system for facilitating a dynamic rate limit, the system comprising:

a computer system comprising one or more processors programmed with computer program instructions that, when executed, cause the computer system to:
- determine, for a first time period, an amount of aggregated bandwidth consumption for a set of computing devices on a network;
- determine, for the first time period, a total amount of available bandwidth on the network;
- determine a ratio of the amount of aggregated bandwidth consumption to the total amount of available bandwidth;
- determine, based on the ratio, a first bandwidth threshold;
- determine a second bandwidth threshold;
- determine first bandwidth consumption of the first computing device for the first time period;
- determine second bandwidth consumption of the first computing device for a second time period of different length than the first time period;
- classify a first computing device of the set of computing devices based on (i) a comparison of the first bandwidth threshold to at least one of the first bandwidth consumption or the second bandwidth consumption and (ii) a comparison of the second bandwidth threshold to at least a different one of the first bandwidth consumption or the second bandwidth consumption; and
- dynamically set a rate limit for the first computing device based on the classification of the first computing device.

17. The system of claim 16, wherein the computer system is caused to:
- determine a downstream bandwidth consumption of the first computing device, the downstream bandwidth consumption being associated with downstream traffic of the first computing device, the first bandwidth consumption of the first computing device comprising the downstream bandwidth consumption of the first computing device,
- wherein classifying the first computing device comprises classifying the first computing device based on a comparison of the first bandwidth threshold to the downstream bandwidth consumption of the first computing device.

18. The system of claim 16, wherein the computer system is caused to:
- determine a upstream bandwidth consumption of the first computing device, the upstream bandwidth consumption being associated with upstream traffic of the first computing device, the first bandwidth consumption of the first computing device comprising the upstream bandwidth consumption of the first computing device,
- wherein classifying the first computing device comprises classifying the first computing device based on a comparison of the first bandwidth threshold to the upstream bandwidth consumption of the first computing device.

* * * * *